Figure 1:
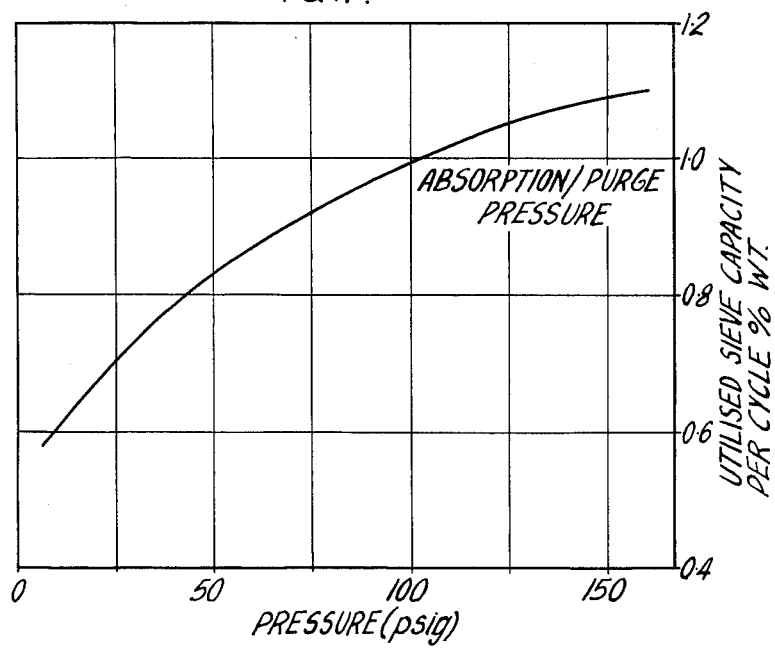

Aug. 17, 1965  R. N. LACEY ETAL  3,201,490
SEPARATION OF MIXTURES
Filed Jan. 26, 1962  4 Sheets-Sheet 1

INVENTORS
RICHARD N. LACEY
ALAN A. YEO
ROGER T. L. MOWLL
BY Morgan, Finnegan, Durham & Pine
ATTORNEYS

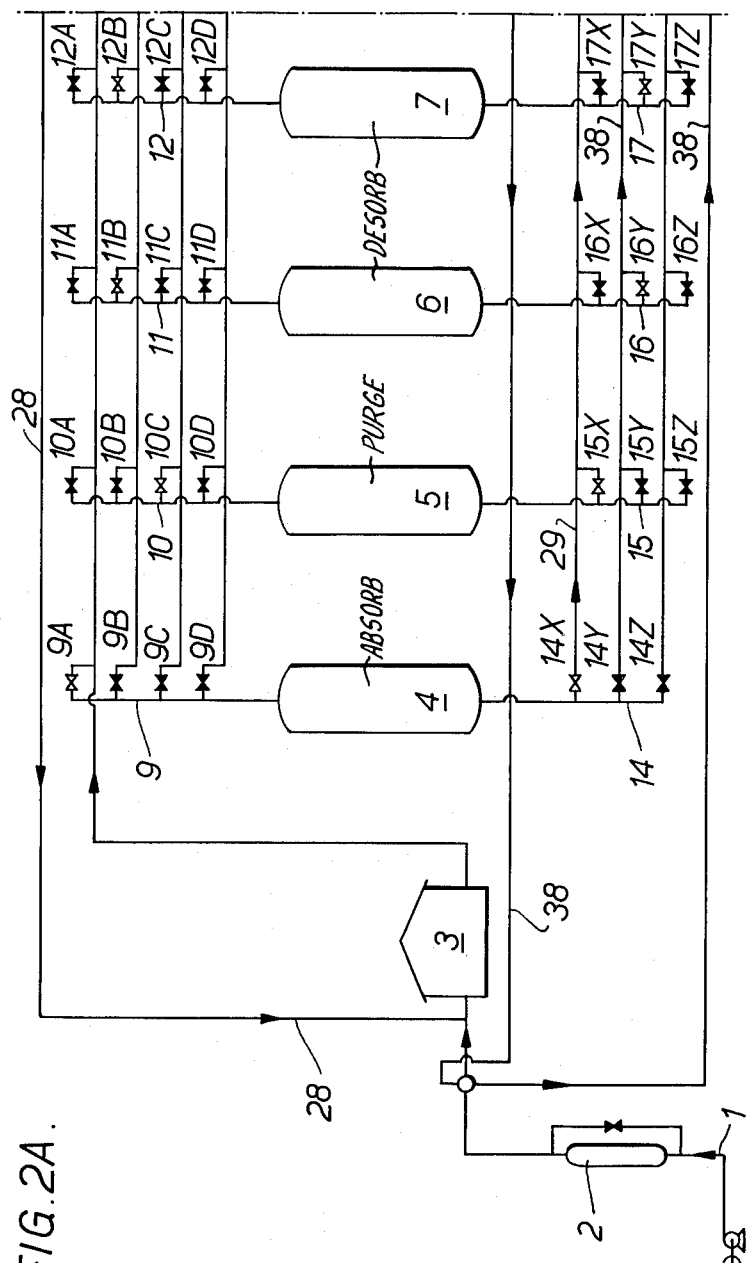

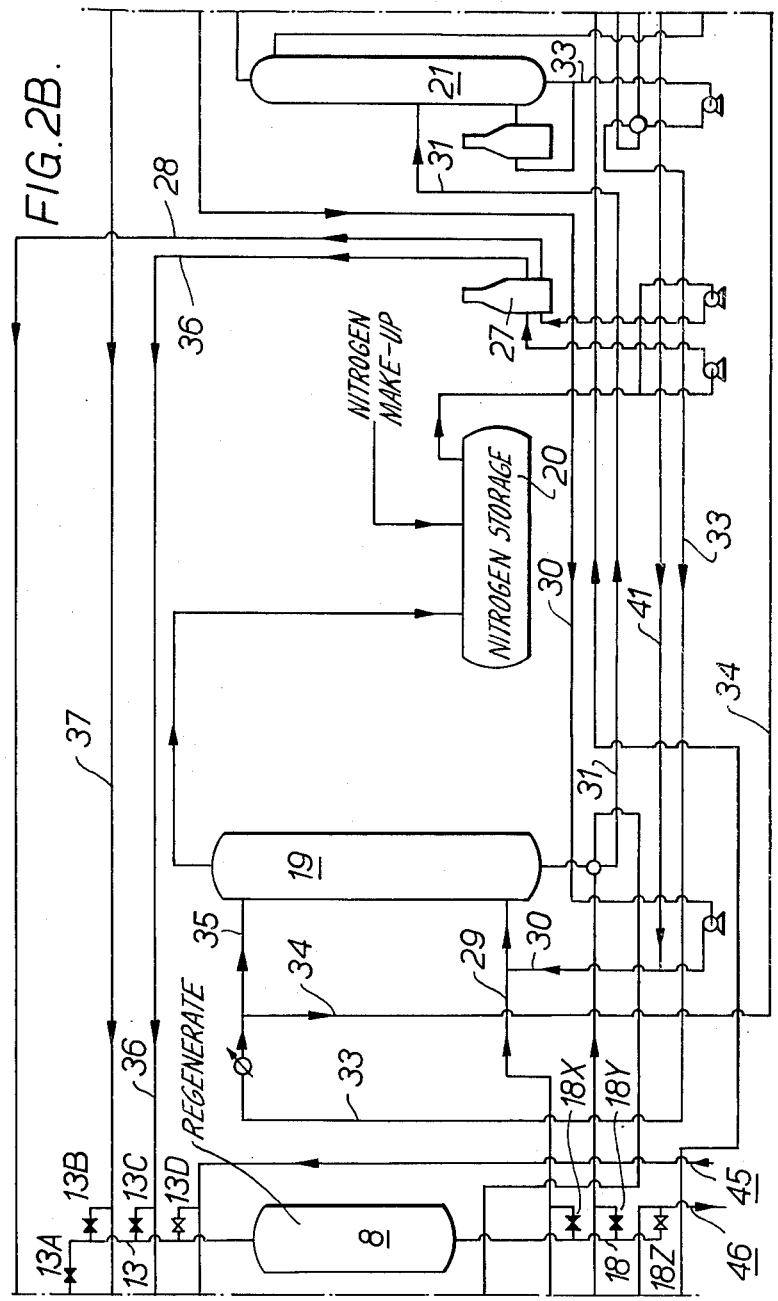

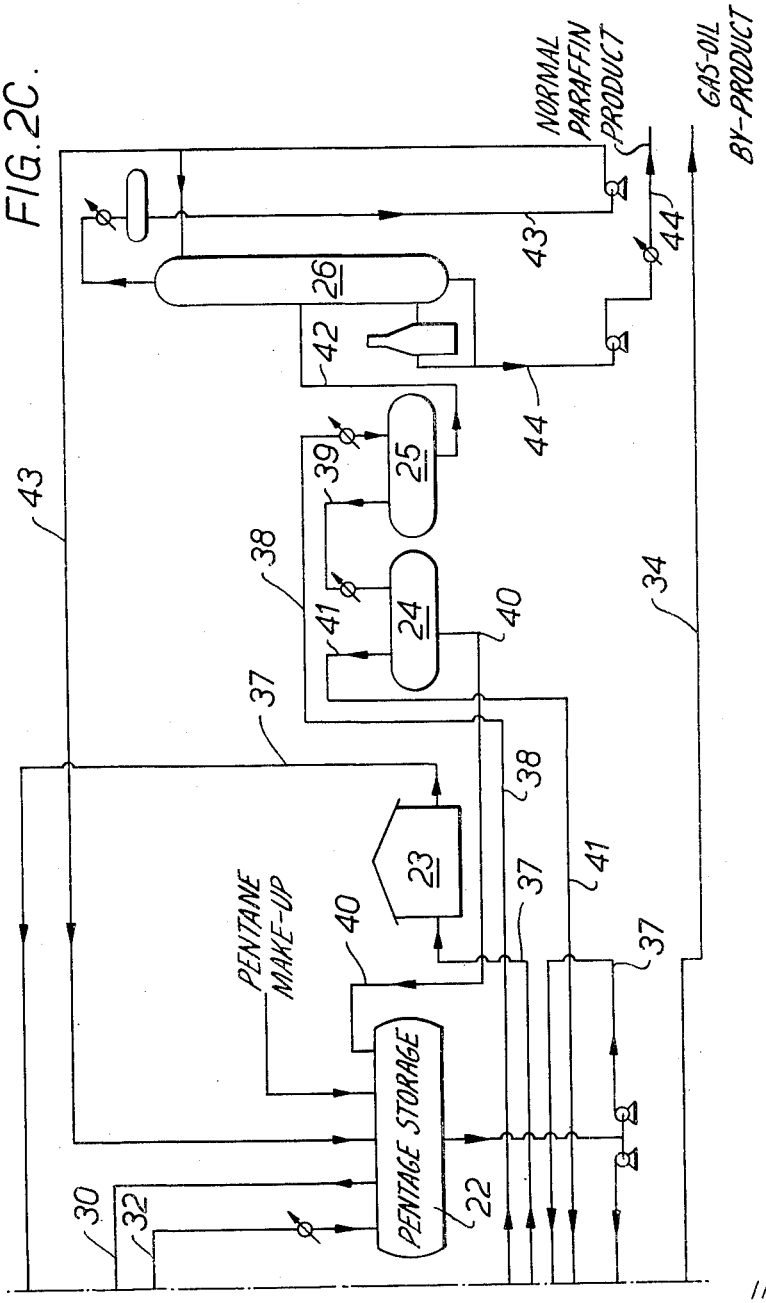

United States Patent Office 3,201,490
Patented Aug. 17, 1965

3,201,490
SEPARATION OF MIXTURES
Richard Norman Lacey, Alan Arthur Yeo, Roger Templeton Lewis Mowll, all of Sunbury-on-Thames, England, assignors to The British Petroleum Company Limited, London, England, a British joint-stock corporation
Filed Jan. 26, 1962, Ser. No. 168,981
Claims priority, application Great Britain, Feb. 2, 1961, 3,965/61
12 Claims. (Cl. 260—676)

This invention relates to a separation process using molecular sieves and particularly to a process for the separation of straight-chain hydrocarbons from petroleum fractions boiling within the gas-oil range.

It is well known that certain natural and synthetic zeolites have the property of preferentially absorbing certain types of hydrocarbons. These zeolites, known as molecular sieves, have crystalline structures containing a large number of pores of uniform size. In different zeolites, these pores may vary from 4 A. to 15 A. or more in diameter, but in any one zeolite the pores will be of substantially uniform size.

It has previously been proposed to treat petroleum fractions ranging from gasoline to gas-oils and higher with molecular sieves having pore diameters ranging from 4 A. to 15 A. In order to separate straight-chain hydrocarbons from branched-chain and/or cyclic hydrocarbons a molecular sieve having pore diameters of 5 A. is suitable. Such a process may be used to recover a denormalised fraction, for example gasoline of higher octane number due to the removal of low octane normal paraffins. The absorbed straight-chain material may also be recovered as a product if desired.

According to the present invention, an isothermal process for the separation of straight-chain hydrocarbons from petroleum fractions boiling in the $C_{10}$-$C_{20}$ range comprises contacting the fraction with a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using either n-pentane or n-butane as desorbing medium, all three stages being in the vapour phase, the pressure in the desorption stage being equal to, or greater than, the pressure in the absorption stage, and recovering the desorbed straight-chain hydrocarbons in a purity of at least 95% weight.

In many molecular sieve operations, for example the upgrading of gasoline by removal of n-paraffins, the purity of the desorbate is not of particular importance. However, when it is of importance, as in the present process, it is clearly necessary to prevent, as far as possible, contamination of the desorbate with material adsorbed on the surface of the sieve or held interstitially between sieve particles. The problem is accentuated when dealing with gas oils as compared with lighter feedstocks in view of the higher boiling range of hydrocarbons present. One important feature of the present process is to remove surface adsorbed and interstitially held material from the sieve by means of a suitable purging step carried out between the absorption and desorption stages. This purging step may conveniently be carried out at substantially the same pressure as either the absorption or the desorption stage using a suitable purging medium, for example a straight-chain hydrocarbon having from one to five carbon atoms in the molecule, or preferably, nitrogen. Where a straight-chain hydrocabon is used for purging, particularly n-butane or n-pentane, the conditions should be chosen so as to avoid desorbing any substantial amount of straight-chain material from the pores of the sieve.

This may be done, for example, by limiting the purging to a relatively brief period.

Another important feature of the present invention is the correct choice of desorbing agent. Prima facie the best desorbing agents are n-hydrocarbons which differ from the absorbed hydrocarbons by relatively few carbon atoms. For example, when desorbing a 220–320° C. A.S.T.M. boiling range gas oil it has been found that equivalent desorptions are obtained with 1 part by weight of n-heptane, 2.5 parts by weight of n-pentane and 6 parts by weight of n-butane. Nevertheless, the n-pentane and n-butane give a desorbate of greater purity than n-heptane under equivalent conditions and a particular feature of the present invention is the use of n-butane or n-pentane as desorbing agents to assist in obtaining products of the required purity in spite of the fact that they are less efficient displacing agents than higher-boiling n-paraffins. The use of paraffins boiling below n-butane is effectively precluded by the large volume which must be used to effect adequate desorption.

If the feedstocks to the process contain appreciable quantities of sulphur, it is desirable to pretreat them to reduce the sulphur content to 0.1% or below, preferably to a value within the range 0.005–0.015% weight.

The process is operated isothermally and the temperature should lie within the range 300–450° C. It has been found that the yield of n-paraffin product increases with increasing temperature. It has also been found that above a certain temperature, i.e. that at which cracking of the feedstock commences, the capacity decay rate of the sieve also increases, thus counteracting any increase in product yield. Preferably, therefore, the present invention is operated at as high a temperature as possible but below the temperature at which appreciable cracking takes place, preferably within the range 350–390° C.

All three stages of the process are preferably conducted at elevated pressures and it has been found favourable to employ a desorption pressure which is equal to or greater than the absorption pressure. Suitable pressures for all three stages lie within the range 50–300 p.s.i.g. but preferred absorption pressures are within the range 100–150 p.s.i.g. The preferred desorption pressures are from 0–100 p.s.i.g. higher than the absorption pressure and the purge pressure is preferably the same as the absorption pressure. Isobaric operation is particularly preferred.

It is desirable to introduce a certain amount of a purging agent into the feedstock to assist vaporisation and absorption. Examples of such agents includes any of the purging materials mentioned previously but nitrogen is the preferred agent.

After an extended period of operation the molecular sieve tends to become deactivated, particularly by the deposition of carbonaceous materials. When the sieve has become sufficiently deactivated it may be regenerated, for example by burning off the carbonaceous deposits in a known manner by means of an oxygen-containing gas. The intervals between successive regenerations may be of the order of several hundreds of hours.

According to a further preferred feature of the invention the process is operated continuously by having at least 3 separation zones in parallel so that at any given moment one or more zones are absorbing while one or more other zones are being purged and one or more zones are being desorbed. Preferably the number of zones operating at any given moment is 4 or a multiple of four and preferably at least one other zone is available as a spare. Preferably, at any one point of time, the ratio of absorption, purge and desorption stages is 1:1:2 and the ratio of the length of the time of the absorption, purge and desorption stages is also 1:1:2. Preferably the particular periods are 6, 6 and 12 minutes respectively. The provision of a spare zone enables the sieves to be regenerated in turn without interruption of the process.

A particularly preferred embodiment of the present invention is therefore a continuous isothermal process for the separation of straight-chain hydrocarbons from petroleum fractions boiling in the $C_{10}$–$C_{20}$ range and their recovery in a purity of at least 95% weight which comprises contacting the fraction with a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using either n-pentane or n-butane as desorbing medium, recovering the desorbed straight-chain hydrocarbons in a purity of at least 95% weight, periodically regenerating the sieve by burning off carbonaceous deposits, the absorption, purge and desorption stages being in the vapour phase and the pressure in the desorption stage being equal to, or greater than, the pressure in the absorption stage, and in which there are 4, or a multiple of 4, zones which alternate as absorption, purge and desorption zones plus one further zone, the ratio at any point of time of absorption, purge and desorption stages being 1:1:2 and the length of time of the absorption, purge and desorption stages being also 1:1:2 and the further zone being used for the regeneration of the sieve.

The invention is illustrated by means of the following examples:

*Example 1*

A Middle East gas-oil boiling within the range 220–340° C. and containing 0.01% weight of sulphur was treated with a 5 A. molecular sieve under the following conditions:

| Stage | Feed | Temperature, °C. | Space Velocity, v./v./hr. | Period, mins. |
| --- | --- | --- | --- | --- |
| Absorption | Gas-oil<br>Nitrogen | 380 | 0.8<br>120 | 6 |
| Purging | Nitrogen | 380 | 120 | 6 |
| Desorption | n-Pentane | 380 | 1.0 | 12 |

An improved utilized sieve capacity is obtained by increasing the desorption pressure with the absorption and purge pressure being fixed.

*Example 2*

The gas oil of example was treated with a 5 A. molecular sieve under the following conditions:

| Stage | Feed | Temperature, °C. | Pressure, p.s.i.g. | Space Velocity, v./v./hr. | Period, mins. |
| --- | --- | --- | --- | --- | --- |
| Absorption | Gas-oil<br>Nitrogen | 380 | 150 | 0.8<br>120 | 6 |
| Purge | Nitrogen | 380 | 150 | 120 | 6 |
| Desorption | n-Pentane | 380 | 150 | 1.0 | 12 |

The yield of n-paraffins was 1.15% sieve weight per cycle in a purity in excess of 95% (GLC analysis).

*Example 3*

The gas-oil of Example 1 was treated with a 5 A. molecular sieve under the following conditions:

| Stage | Feed | Temperature, °C. | Pressure, p.s.i.g. | Space Velocity, v./v./hr. | Period, mins. |
| --- | --- | --- | --- | --- | --- |
| Absorption | Gas-oil<br>Nitrogen | 350 | 125 | 0.63<br>120 | 6 |
| Purge | Nitrogen | 350 | 125 | 120 | 6 |
| Desorption | n-Pentane | 350 | 125 | 1.0 | 12 |

The yield of n-paraffins was 0.95% sieve weight per cycle in a purity in excess of 95% (GLC analysis).

*Example 4*

A Middle East gas-oil boiling within the range 220–350° C. and containing 0.001% sulphur was treated with a 5 A. sieve under the following conditions:

| Stage | Feed | Pressure, p.s.i.g. | Space Velocity, v./v./hr. | Period, mins. |
| --- | --- | --- | --- | --- |
| Absorption | Gas-oil<br>Nitrogen | 125 | 0.6<br>120 | 6 |
| Purge | Nitrogen | 125 | 120 | 6 |
| Desorption | n-Pentane | 125 | 1.0 | 12 |

The effect of increasing temperature on the Capacity Decay Rate and on the Regeneration Interval is illustrated in the following table:

| Temperature | Capacity Decay Rate, gms./1,000 gms. sieve/100 hours on stream | Regeneration Interval, hours |
| --- | --- | --- |
| 350° C. | 1.0 | 400 |
| 380° C. | 1.0 | 400 |
| 400° C. | 3.8 | 105 |

At temperatures of 350–380° C. the Capacity Decay Rate is steady within the limits of experimental error at 1.0 gms./1000 gms. sieve/100 hours on stream necessitating regeneration at intervals of 400 hours. At 400° C. however the Capacity Decay Rate increases sharply to 3.8 gms./1000 gms. sieve/100 hours on stream necessitating regeneration after only 105 hours. This increase in the Capacity Decay Rate is associated with the onset of cracking.

The invention is further illustrated by the accompanying FIGS. 1A, 1B, 1C which are, in combination, a schematic flow diagram of a process for the separation of n-paraffins from gas-oils.

In FIGS. 1 the main items of equipment comprise feed line 1, guard bed 2, heater 3, reactors 4, 5, 6, 7 and 8 having respectively inlet valve systems 9, 10, 11, 12 and 13 and outlet valve systems 14, 15, 16, 17 and 18, nitrogen flash separator 19, nitrogen storage drum 20, pentane separating column 21, pentane storage drum 22, heater 23, separator drums 24 and 25 separating column 26. Various other items of equipment are indicated and referred to as necessary below.

Gas-oil feedstock is pumped from storage via line 1 through guard bed 2 containing 4 A. molecular sieve in which traces of water or other undesirable polar compounds are removed from the feedstock. The feedstock, after heat exchanging with n-paraffinic reactor effluent and dilution with nitrogen introduced from nitrogen storage drum 20 via heater 27 and line 28, passes through heater 3 in which the temperature of the gas-oil-nitrogen mixture is raised to 380° C. The mixture then passes into reactor 4, containing 5 A. molecular sieve, via valve 9A. In reactor 4, straight-chain paraffins from the gas-oil, are absorbed into the sieve and the denormalised gas-oil, together with nitrogen diluent, passes via valve 14X and line 29 into nitrogen flash separator 19 together with n-pentane introduced into line 29 from pentane storage drum 22 via line 30. In flash separator 19, nitrogen is removed overhead and returned to nitrogen storage drum 20; denormalised gas-oil and pentane pass from the base of separator 19 in heat exchange with n-paraffinic reactor effluent via line 31 to pentane separating column 21. In column 21, pentane is distilled off and returned via line 32 to pentane storage drum 22 while the depentanised, denormalised gas-oil passes from the base of column 21 via line 33 partially to storage via line 34, a part being recycled to separator 19 via line 35.

Reactor 5 meanwhile, having previously undergone an absorption stage as described above for reactor 4, is purged with nitrogen introduced from storage drum 20 via heater 27, line 36 and valve 10C. Non-absorbed material from reactor 5 together with nitrogen pass via valve 15X into line 29 carrying the effluent from absorbing reactor 4.

At the same time, reactors 6 and 7 are undergoing desorption by means of n-pentane introduced from pentane storage drum 22 via heater 23, line 37 and respectively valves 11B and 12B. Desorbed n-paraffins together with n-pentane pass from reactors 6 and 7 respectively via valves 16Y and 17Y into line 38 and thus into separator drum 25. In drum 25 some n-pentane is separated and passed via line 39 to drum 24 from which part is returned to storage drum 22 via line 40 and part passed via line 41 into line 30 and thence with denormalised gas-oil in line 29 to separator 19. The n-paraffins, together with some n-pentane, pass from drum 25 via line 42 into separating column 26 in which pentane is distilled off and returned to storage drum 22 via line 43, n-paraffins being passed from the base of column 26 to storage via line 44. Instead of desorbing reactors 6 and 7 in parallel as shown and described above, it is possible, if desired, to desorb them in series. This may be done by passing n-pentane into the top of reactor 6 only, the effluent from the base of reactor 6 being passed into the top of reactor 7 and the effluent from reactor 7 being treated as described above for the parallel desorption operation.

Reactor 8, meanwhile, having become deactivated in use due to the deposition of carbonaceous and other deactivating material is regenerated as required by the introduction of oxygen-containing gas via line 45 and valve 13D, combustion gases being removed via valve 18Z and line 46.

The pressure in each of the reactors, other than the reactor undergoing regeneration, is maintained in the region of 125 p.s.i.g.

After a period of 6 minutes has elapsed from the commencement of the absorption stage in reactor 4, valves 9A, 10C, 12B, 15X and 17Y are atuomatically closed while valves 9C, 10B, 12A, 15Y and 17X are automatically opened. Reactor 4 is then purging, reactors 5 and 6 desorbing and reactor 7 absorbing, reactor 8 continuing to regenerate. Every 6 minutes a similar change takes place so that each of the operating, i.e. non-regenerating, reactors continuously undergoes successively a 6 minute absorbing stage, a 6 minute purging stage and a 12 minute desorbing stage.

When, in due course, one of reactors 4–7 becomes sufficiently deactivated it is replaced by the now regenerated reactor 8 and the deactivated reactor regenerated in turn.

We claim:

1. An isothermal process for the separation of straight-chain hydrocarbons from petroleum fractions boiling in the $C_{10}$–$C_{20}$ range and pretreated to reduce the sulfur content to a value not exceeding 0.1% weight comprising contacting the fratcion with a number of fixed beds of a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using a desorbing medium selected from the group consisting of n-pentane and n-butane, all three stages being in the vapour phase and at a temperature in the range of 300–450° C., the pressure in the desorption stage being at least equal to the pressure in the absorption stage, the ratio of absorption, purge and desorption stages at any point of time is 1:1:2 and the ratio of the length of time of the absorption, purge and desorption stages is also 1:1:2 and recovering the desorbed straight-chain hydrocarbons in a purity of at least 95% weight.

2. A process as claimed in claim 1 wherein the purging medium employed is nitrogen.

3. A process as claimed in claim 1 wherein the feedstock is pretreated to reduce the sulphur content to a value within the range 0.005–0.015% weight.

4. A process as claimed in claim 1 wherein the operating temperature lies within the range 350–390° C.

5. A process as claimed in claim 1 wherein the absorption pressure lies within the range 50–300 p.s.i.g.

6. A process as claimed in claim 5 wherein the absorption pressure lies within the range 100–150 p.s.i.g.

7. A process as claimed in claim 1 wherein the desorption pressure is from 0–100 p.s.i.g. higher than the absorption pressure.

8. A process as claimed in claim 1 wherein the feed to the absorption stage is diluted with nitrogen.

9. A process as claimed in claim 1 wherein the ratio at any point of time of absorption, purge and desorption stages is 1:1:2 and the ratio of the length of time of the absorption, purge and desorption stages is also 1:1:2.

10. A process as claimed in claim 1 wherein the period of absorption is 6 minutes.

11. A continuous isothermal process for the separation of straight-chain hydrocarbons from petroleum fractions boiling in the $C_{10}$–$C_{20}$ range and pretreated to reduce the sulfur content to a value not exceeding 0.1% weight comprising contacting the fraction with a number of fixed beds of a 5 A. molecular sieve in a first stage to absorb straight-chain hydrocarbons, contacting the sieve with a purging medium in a second stage to remove material adsorbed on the surface of the sieve or held interstitially between sieve particles, desorbing the absorbed hydrocarbons in a third stage using a desorbing medium selected from the group consisting of n-pentane and n-butane, recovering the desorbed straight-chain hydrocarbons in a purity of at least 95% wt. and periodically regenerating the sieve by burning off carbonaceous deposites, the absorption, purge and desorption stages being in the vapour phase and at a temeprature in the range of 300–450° C. and the pressure in the desorption stage being at least equal to the pressure in the absorption stage, and in which there are 4 zones which alternate as absorption, purge and desorption zones, plus one further zone, the ratio at any point of time of absorption, purge and desorption stages being 1:1:2 and the length of time of the absorption, purge and desorption stages being also 1:1:2 and the further zone being used for the regeneration of the sieve.

12. A process as claimed in claim 11 in which there is a multiple of 4 zones which alternate as absorption, purge and desorption zones, plus one further zone.

References Cited by the Examiner

UNITED STATES PATENTS

| | | | |
|---|---|---|---|
| 2,908,639 | 10/59 | Carter et al. | 260—676 |
| 2,921,970 | 1/60 | Gilmore | 260—676 |
| 2,952,630 | 9/60 | Eggertsen | 260—676 |
| 2,978,407 | 4/61 | Tuttle | 260—676 |
| 2,987,471 | 6/61 | Eggertsen | 260—676 |
| 2,988,502 | 6/61 | Richards et al. | 260—676 |
| 3,053,913 | 9/62 | Norris | 260—676 |
| 3,095,288 | 6/63 | Sensel | 260—676 |

ALPHONSO D. SULLIVAN, *Primary Examiner.*

UNITED STATES PATENT OFFICE
CERTIFICATE OF CORRECTION

Patent No. 3,201,490                                      August 17, 1965

Richard Norman Lacey et al.

It is hereby certified that error appears in the above numbered patent requiring correction and that the said Letters Patent should read as corrected below.

In the drawings, strike out the first sheet of drawings containing FIG. 1; Sheet 2, for "FIG. 2A" read -- FIG. 1A --; Sheet 3, for "FIG. 2B" read -- FIG. 1B --; Sheet 4, for "FIG. 2C" read -- FIG. 1C. --; Sheet 2, for "4 Sheets-Sheet 2" read -- 3 Sheets-Sheet 1 --; Sheet 3, for "4 Sheets-Sheet 3" read -- 3 Sheets-Sheet 2 --; Sheet 4, for "4 Sheets-Sheet 4" read -- 3 Sheets-Sheet 3 --; column 6, line 22, beginning with "9. A process as" strike out all to and including "also 1:1:2." in line 25, same column 6; line 26, for "10." read -- 9. --; line 28, for "11." read -- 10. --; line 54, for "12." read -- 11. --; in the heading to the printed specification, line 10, for "12 Claims." read -- 11 Claims. --.

Signed and sealed this 22nd day of February 1966.

(SEAL)
Attest:

ERNEST W. SWIDER                          EDWARD J. BRENNER
Attesting Officer                        Commissioner of Patents